(12) United States Patent
Blum et al.

(10) Patent No.: US 7,033,676 B1
(45) Date of Patent: Apr. 25, 2006

(54) BINDING AGENT MIXTURES AND THEIR USE IN COATING MATERIALS CURED BY ACTINIC RADIATION AND/OR HEAT

(75) Inventors: Rainer Blum, Ludwigshafen (DE); Jorge Prieto, Senden (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/890,019

(22) PCT Filed: Jan. 21, 2000

(86) PCT No.: PCT/EP00/00439

§ 371 (c)(1),
(2), (4) Date: Sep. 9, 2001

(87) PCT Pub. No.: WO00/44837

PCT Pub. Date: Aug. 3, 2000

(30) Foreign Application Priority Data

Jan. 30, 1999 (EP) .......................... 199 03 725

(51) Int. Cl.
| | |
|---|---|
| B32B 27/36 | (2006.01) |
| B32B 27/30 | (2006.01) |
| B32B 27/38 | (2006.01) |
| B32B 27/40 | (2006.01) |
| B05D 3/00 | (2006.01) |

(52) U.S. Cl. .............. 428/480; 428/413; 428/423.1; 428/500; 428/523; 427/487; 427/493; 427/385.5; 525/165; 525/166; 525/175; 525/176; 525/177; 525/92 C; 525/92 F; 525/92 H; 525/95; 525/96; 525/97; 525/454; 525/533

(58) Field of Classification Search .............. 525/10, 525/43, 453, 454, 523, 533, 88, 89, 92 C, 525/92 F, 92 H, 93, 95, 96, 97, 165, 166, 525/175, 176, 177; 427/487, 493, 385.5; 428/413, 423.1, 480, 500, 523
See application file for complete search history.

(56) References Cited

U.S. PATENT DOCUMENTS

| | | | |
|---|---|---|---|
| 3,445,336 A | 5/1969 | Tanaka et al. ............. 195/28 |
| 4,129,488 A | 12/1978 | McGinniss ........... 204/159.19 |
| 4,163,810 A | 8/1979 | McGinniss ................ 427/54 |
| 5,068,305 A | 11/1991 | Meixner et al. ............ 528/49 |
| 5,202,483 A | 4/1993 | Rehmer et al. ........... 564/207 |
| 5,206,417 A | 4/1993 | Boettcher et al. ......... 560/137 |
| 5,223,645 A | 6/1993 | Barwich et al. .......... 564/158 |
| 5,484,850 A | 1/1996 | Kempter et al. .......... 525/286 |
| 5,527,859 A | 6/1996 | Kempter et al. .......... 525/301 |
| 5,576,386 A | 11/1996 | Kempter et al. ............ 526/88 |
| 5,620,751 A | 4/1997 | Brindoepke et al. ....... 427/506 |
| 5,690,569 A | 11/1997 | Ledvina et al. ........... 474/111 |
| 5,726,258 A | 3/1998 | Fischer et al. ............. 526/64 |
| 6,133,337 A * | 10/2000 | Blum et al. ............... 522/104 |
| 6,162,840 A * | 12/2000 | Blum et al. ................ 522/24 |
| 6,165,557 A * | 12/2000 | Blum et al. ............. 427/385.5 |
| 6,200,645 B1 * | 3/2001 | Blum et al. .............. 427/487 |
| 6,288,146 B1 * | 9/2001 | Blum et al. .............. 523/500 |
| 6,313,250 B1 * | 11/2001 | Blum et al. .............. 526/284 |
| 6,541,535 B1 * | 4/2003 | Blum et al. ............... 522/35 |
| 6,632,481 B1 * | 10/2003 | Blum et al. .............. 427/496 |

FOREIGN PATENT DOCUMENTS

| | | |
|---|---|---|
| DE | 1 570 027 | 4/1970 |
| DE | 28 48 966 A1 | 5/1980 |
| DE | 38 20 463 A1 | 12/1989 |
| DE | 40 07 318 A1 | 9/1991 |
| DE | 197 09 476 A1 | 3/1996 |
| DE | 195 24 182 A1 | 1/1997 |
| DE | 196 00 136 A1 | 10/1997 |
| DE | 196 00 152 A1 | 10/1997 |
| DE | 197 09 465 A1 | 9/1998 |
| EP | 0 410 242 A2 | 7/1990 |
| EP | 0 486 897 A1 | 11/1990 |
| EP | 0 554 783 A1 | 1/1993 |
| EP | 0 636 669 A2 | 7/1993 |
| EP | 0 585 742 B1 | 8/1993 |
| EP | 0 650 978 A1 | 11/1993 |
| EP | 0 650 979 A1 | 11/1993 |
| EP | 0 650 985 A1 | 11/1993 |
| WO | WO 82/02387 | 7/1982 |
| WO | WO 95/27742 | 10/1995 |
| WO | WO 97/25365 | * 7/1997 |
| WO | WO 97/25387 | * 7/1997 |

OTHER PUBLICATIONS

English Abstract for DE 196 00 152 A1.
English Abstract DE 196 00 136 A1.
English Abstract for DE 284 8966.
English Abstract for DE 197 09465.
English Abstract for EP 650 985.

* cited by examiner

Primary Examiner—Michael J. Feely

(57) ABSTRACT

A binder mixture comprises at least one polymer (A) with saturated main chain that is not a polyester and at least one polyester (B) with a saturated and/or unsaturated main chain, where
(i) one of the two components (A) or (B) contains structural units I and/or II, or both components (A) and (B) contain structural units I and/or II,

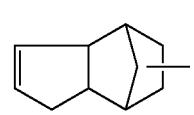
(I)

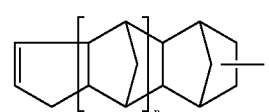

(II)

in which the index n is an integer from 1 to 10;
and where (ii) at least polyester (B) that contains no structural units I and/or II contains maleic and/or fumaric esters incorporated in its main chain.

22 Claims, No Drawings

BINDING AGENT MIXTURES AND THEIR USE IN COATING MATERIALS CURED BY ACTINIC RADIATION AND/OR HEAT

The present invention relates to novel binder mixtures and to their use in coating materials or as coating materials which are curable thermally and/or with actinic radiation. The present invention further relates to the novel coating materials which comprise or consist of the novel binder mixtures, and to their use for automotive OEM finishing, automotive refinish, industrial coating, including coil coating and container coating, the coating of plastics, and furniture coating. The invention further relates to a novel process for coating substrates which uses the novel coating materials, and also to the substrates thus coated.

Coating materials curable with actinic radiation, especially with UV radiation, and in liquid form or in the form of powder coating materials are increasingly gaining significance for reasons of reduced solvent use and are increasingly being put to new end uses. A principal problem with the known UV-curable coating materials, however, is the surface inhibition of curing by atmospheric oxygen. This inhibition must be compensated by using UV lamps with a high energy density and by accelerating the cure using amine coinitiators. These amines, however, frequently lead to instances of odor nuisance, and may result in unwanted discoloration of the coatings.

In the case of UV powder coating materials, further problems arise from the contradictory requirements for good blocking resistance of the powders on storage and good leveling of the melted coating film. For good blocking resistance, the glass transition temperature and melting point should be as high as possible; for good leveling and for use on heat-sensitive substrates, however, they should be as low as possible, in order to prevent a curing reaction before an optimum surface smoothness has developed, and in order to prevent damage to the substrate. For improving the surface smoothness, moreover, the melt should also have a low viscosity, and the reaction should set in only after a delay. However, such a profile of properties is difficult to realize with powder coating materials curable by means of heat alone, whose curing is—as is known—based on a thermally activated reaction between binder and crosslinking agent, e.g., between a polyepoxy resin and a dicarboxylic acid, since simultaneous with the melting process there is a viscosity-raising crosslinking reaction. In the case of powder coating materials curable with actinic radiation, on the other hand, it ought to be possible to separate the melting process from crosslinking or curing.

Powder coating materials known to date and curable with actinic radiation, which are said to meet these requirements, are based on polymers having readily polymerizable, generally acrylic or vinylic, double bonds.

The patents U.S. Pat. No. 4,129,488 and U.S. Pat. No. 4,163,810 describe UV-curable powder coating materials having specific spatial arrangements of olefinically unsaturated polymers. Here, the binder consists of an epoxy-polyester polymer in which the epoxy adduct is arranged spatially such that by means of a linear polymer chain it is at a distance from the polyester adduct. In addition, the polymer comprises a chemically bonded photoinitiator.

The European patents EP-A-0 650 978, EP-A-0 650 979, and EP-A-0 650 985 describe copolymers whose essential constituent is a relatively high fraction of methacrylate monomers. The copolymers may be used as binders for UV-curable powder coating materials, and feature a relatively narrow molecular weight distribution.

The European patent EP-A-0 410 242 discloses binders for UV-curable powder coating materials, consisting of polyurethanes having specific (meth)acryloyl groups. These polyurethanes may be crosslinked without crosslinking agents or peroxides, and are therefore stable on storage. Crosslinking by means of UV radiation, on the other hand, requires photoinitiators. The polyurethanes may also be used in a mixture with solid unsaturated polyesters.

Furthermore, the European patent EP-A-0 636 669 discloses UV-curable powder coating materials which comprise a mixture of unsaturated polymers (binder) and unsaturated crosslinking agents. Binders mentioned include, in particular, unsaturated polyesters and unsaturated polyacrylates, which may contain cyclopentadiene, and crosslinking agents mentioned include polyurethanes containing vinyl ether, vinyl ester or (meth)acryloyl groups.

These known UV-curable powder coating materials have problems which arise from the thermal sensitivity of the polymerizable double bonds that are used in them. This thermal sensitivity leads to a situation where, owing to the preparation, which is generally carried out in a solvent, to the removal of the solvent, and to the powder coating compounding which is carried out in repeated melt processes, there is a loss of reactivity and a partial crosslinking.

The removal of the solvent in particular is critical since on the one hand even small fractions of residual solvent considerably impair the blocking resistance of the powders while, on the other hand, energetic thermal drying methods frequently result in premature thermal crosslinking of the double bonds. Accordingly, the European patent EP-A-0 585 742, for example, proposes subjecting an acrylically unsaturated polyurethane which is synthesized in a solvent to strong dilution with acetone, then precipitating it with a large amount of water and drying it at room temperature; this, however, is a disproportionately complex process which, moreover, produces a large fraction of waste products.

Furthermore, the known unsaturated binders have a marked crosslinking activity even in the solid state, e.g., as compounded UV powder coating materials, under ambient light conditions, and so can only be handled under filtered light.

It is an object of the present invention to provide stable coating materials, especially powder coating materials, which are of low viscosity at melt temperature and yet have a high reactivity on exposure to actinic radiation, especially UV light. Furthermore, the coating materials, especially the powder coating materials, ought to have a good crosslinking stability at melt temperature, leading to the development of effective leveling, in customary coat thicknesses and in air. Moreover, they should have a high reactivity on exposure to actinic radiation, especially UV light, in the region of the melting point, which is something which is necessary for combined curing by heat and actinic radiation, especially UV light. Not least, they ought to have a low level of photosensitivity in the unmelted state in order that they may be handled under normal ambient lighting conditions without risk of crosslinking.

The invention accordingly provides the novel binder mixture comprising
(A) at least one polymer with a saturated main chain that is not polyester and
(B) at least one polyester having a saturated and/or unsaturated main chain,
(i) one of the two components (A) or (B) having structural units I and/or II, or both components (A) and (B) having structural units I and/or II,

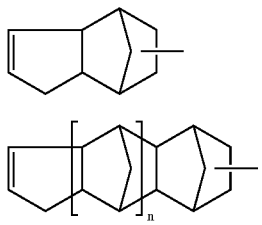

(I)

(II)

in which the index n is an integer from 1 to 10; and (ii) at least the polyester (B) that has no structural units I and/or II containing maleic and/or fumaric esters incorporated in its main chain.

In the text below, the novel binder mixture is referred to as the "binder mixture of the invention".

The invention further provides novel coating materials, especially powder coating materials, curable thermally and/or with actinic radiation, which comprise or consist of the binder mixture of the invention.

In the text below, the novel coating materials are referred to as "coating materials of the invention" or "powder coating materials of the invention".

The invention provides not least a novel process for coating substrates, which uses the coating materials or powder coating materials of the invention.

The binder mixtures and coating materials of the invention are curable with actinic light, preferably electron beams and UV light, but especially UV light. In addition, curing to a B-stage, i.e., to a partially cured stage at which curing is interrupted and can be recommenced later in time, is possible without problems.

The binder mixtures and coating materials of the invention may be employed as solutions or dispersions in organic solvents or in water in the same way as known coating materials are employed. Moreover, selected binder mixtures, directly or following addition of peroxide initiators, may also be cured by means of heat alone, by baking.

The coating materials of the invention find a specific and preferred application as powder coating materials. The powder coating materials of the invention are notable for low thermal sensitivity, short curing times with combined use of heat and UV light, good blocking resistance on storage, and very good surface smoothness of the coatings or coating systems obtained from them.

The binder mixtures and coating materials of the invention are substantially free from double bonds which readily undergo thermal polymerization; they have a high level of stability to thermal loads and atmospheric oxygen, and are nevertheless crosslinkable with a high reactivity, surprisingly, on exposure to actinic radiation such as electron beams or, preferably, UV light, especially in the case of simultaneous heating. Furthermore, at room temperature under customary ambient lighting conditions, their photosensitivity is low, and so they can be handled without particular protective measures.

It is a further particular advantage of the binder mixtures or coating materials of the invention that they may be readily combined with substances having readily polymerizable double bonds, especially acrylic or vinylic double bonds, in order to adapt them to specific end uses.

The first key constituent of the binder mixture of the invention is at least one polymer (A) having a saturated main chain that is not a polyester.

In the context of the present invention, a polymer (A) should also be understood as including a comparatively low molecular mass compound or an oligomer (A) provided it has a profile of properties which is not contradictory to its use in the binder mixture of the invention. In particular, it must be solid. In accordance with the invention, however, polymers (A) are of advantage and are therefore used with preference.

The polymer (A) may contain at least one structural unit I and/or II.

These structural units I and/or II may be incorporated in the form of the structural unit V

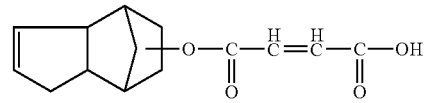

(V) in which the variable X is an oxygen atom or an NH group, but especially an oxygen atom;
and the structural unit II may be incorporated in the form of the structural units VI

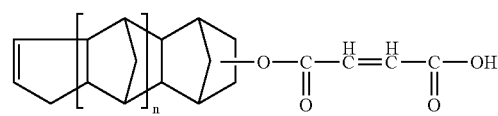

(VI) in which the index n is an integer from 1 to 10 and the variable X is as defined above.

Suitable starting compounds for introducing these structural units V and VI are the maleic and fumaric monoesters of monomeric or oligomeric dihydrodicyclopentadienol.

Where the polymer (A) contains no structural unit I or II, it must contain covalently bonded photoinitiators of the Norrish II type as side groups and/or end groups. Photoinitiators of this kind are customary and known. Their mechanism of action is based on an intramolecular variant of the hydrogen abstraction reactions as occur diversely in photochemical reactions. By way of example, reference may be made here to Römpp Chemie Lexikon, 9th, expanded and revised edition, Georg Thieme Verlag Stuttgart, Vol. 4, 1991. An example of a suitable photoinitiator of this kind for use in accordance with the invention is 4-hydroxybenzophenone.

In the text below, the covalently bonded photoinitiator side groups and end groups of the Norrish II type are referred to for the sake of brevity as "photoinitiator groups II".

In accordance with the invention, polymers (A) containing both at least one structural unit I and/or II and at least one photoinitiator group II are particularly advantageous and are therefore used with very particular preference.

Particularly suitable polymers (A) include polyacrylates, polyurethanes, polyethers, and polyepoxides. They may be used individually or as a mixture. In accordance with the invention, the polyacrylates, the polyurethanes, and the polyepoxides are of advantage and are therefore used with preference. Of these, the polyacrylates are especially advantageous and are therefore used with particular preference in accordance with the invention.

The term "polyurethanes" in this context embraces not only substances whose main chains are linked by way of urethane bonds but also substances having ester or ether chain links, i.e., the compounds known as polyester urethanes and polyether urethanes.

The polyurethanes (A) for use in accordance with the invention may be obtained in a conventional manner from polyfunctional isocyanates and compounds which contain isocyanate-reactive groups, and also from compounds containing at least one structural unit I and/or V, compounds containing at least one structural unit II and/or VI and/or compounds containing at least one structural unit I and/or V and at least one structural unit II and/or VI, these compounds each containing at least one isocyanate-reactive group, and/or from compounds containing at least one photoinitiator group and at least one isocyanate-reactive group.

The structural unit I or V, respectively, may in this case be introduced through the use of, for example, dihydrodicyclopentadienol or its maleic monoesters and fumaric monoesters. The structural unit II or VI, respectively, may be introduced accordingly through the use of oligomeric dihydrodicylopentadienol or its maleic and fumaric monoesters. The photoinitiator group II may be introduced, for example, through the use of 4-hydroxybenzophenone and/or benzophenonetetracarboxylic acid compounds. Where compounds are used which are reactive polyfunctionally with isocyanate, polymers or oligomers are formed.

The polyepoxides (A) for use in accordance with the invention are obtained in conventional manner from epoxy resins which are known per se and are available commercially, for example of the bisphenol A epoxy resin type, by reaction with compounds containing at least one structural unit I and/or V, compounds containing at least one structural unit II and/or VI and/or compounds containing at least one structural unit I and/or V and at least one structural unit II and/or VI, these compounds each containing at least one epoxide-reactive group, and/or from compounds containing at least one photoinitiator group and at least one epoxide-reactive group.

The structural unit I or V, respectively, may in this case be introduced through the use of, for example, dihydrodicyclopentadienol or its maleic monoesters and fumaric monoesters. The structural unit II or VI, respectively, may be introduced accordingly through the use of oligomeric dihydrodicylopentadienol or its maleic and fumaric monoesters. The photoinitiator group II may be introduced, for example, through the use of 4-hydroxybenzophenone or benzophenonetetracarboxylic acid, benzophenonetetracarboxylic anhydrides, benzophenonetetracarboxylic esters and benzophenonetetracarboxamide. Where polymeric epoxy resins or compounds which are reactive polyfunctionally with epoxide are used, polymers or oligomers are formed.

The polyacrylates (A) for use in accordance with the invention are preferably copolymeric poly(meth)acrylates containing in copolymerized form at least one (meth) acrylate monomer, one ethacrylate monomer and/or one cinnamate monomer, but especially a (meth)acrylate monomer, which contains at least one structural unit I and/or V and/or II and/or VI, and/or the maleic and fumaric monoesters of monomeric and oligomeric dihydrodicyclopentadienol; further (meth)acrylic esters; and also, if desired, further olefinically unsaturated monomers copolymerizable therewith. Instead of the structural units I, V, II and/or VI or in addition to them the polyacrylates (A) may contain at least one photoinitiator group II. As (meth) acrylate monomer containing at least one structural unit I and/or V and/or II and/or VI, very particular preference in accordance with the invention is given to the use of dihydrodicyclopentadienyl acrylate.

The photoinitiator group II may be introduced by way of aromatic or part-aromatic compounds which are copolymerizable with (meth)acrylates, are ethylenically unsaturated and are capable before and/or after the polymerization, in the excited-triplet state, of hydrogen abstraction, such as copolymerizable derivatives of benzophenone and substances as described in the patents EP-A-0 486 897, DE-A-38 20 463 and DE-A-40 07 318. These are compounds which are derived from aromatic or part-aromatic ketones or which contain thioxanthone structures.

The photoinitiator group II may further be introduced by polymer-analogous reaction of epoxide side groups, as obtained by copolymerization of glycidyl methacrylate, with appropriate photoinitiators such as 4-hydroxybenzophenone.

In the polyacrylates (A) for use in accordance with the invention the photoinitiators II are present advantageously in amounts of from 5 to 80, preferably from 5 to 30% by weight, based in each case on the polyacrylate (A). With regard to cost, their fraction is kept as low as possible. They greatly influence the photosensitivity of the binder mixtures of the invention. The fraction which is optimum for the particular intended use may therefore be determined by the skilled worker by means of simple preliminary tests.

One preferred method of preparing these polyacrylates (A) is that of solvent-free, free-radical bulk polymerization in a stirred reactor, under atmospheric or superatmospheric pressure or, with particular preference, in continuous through-type reactors, at temperatures above the melting point of the polymers formed, preferably above 140° C. This method produces polyacrylates (A) with a low molecular weight and a narrow molecular weight distribution, which in the case of powder coating materials is highly desirable owing to the resultant narrower melting range and the lower melt viscosity. Moreover, with a bulk polymerization there is no need to remove an auxiliary solvent and it is possible to incorporate pigments and coatings auxiliaries directly into the melt, in which context the very good heat stability of the polyacrylates (A) for use in accordance with the invention is advantageous.

Likewise in accordance with the invention, however, are acrylically unsaturated polyacrylates (A) prepared in a solvent, or by the abovementioned solvent-free technology, which are obtainable, for example, by reacting (meth)acrylic acid with copolymerized glycidyl (meth)acrylate; in this case, however, it is necessary to be aware of the greater thermal sensitivity during workup and powder compounding.

Examples of suitable (co)polymerization processes for preparing the acrylate copolymers (A1) are described in the patents DE-A-197 09 465, DE-C-197 09 476, DE-A-28 48 906, DE-A-195 24 182, EP-A-0 554 783, WO 95/27742, and WO 82/02387.

Taylor reactors are advantageous.

Taylor reactors, which serve to convert substances under the conditions of Taylor flow, are known. They consist substantially of two coaxial concentric cylinders of which the outer is fixed and the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. In addition to the angular velocity of the stirrer, the Taylor number is also dependent on the kinematic viscosity ν of the fluid in the gap and on the geometric parameters, the external radius of the inner cylinder $r_i$, the internal radius of the outer cylinder $r_o$, and the gap width d, the difference between the two radii, in accordance with the following formula:

$$Ta = \omega_i r_i d\, \nu^{-1} (d/r_i)^{1/2} \quad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. Any increase in the rotary speed is accompanied by an increase in the centrifugal force as well. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Accordingly, the flow system behaves as an ideal flow tube in that the vortex pairs pass through the gap with constant residence time, like ideal stirred tanks.

Of advantage in accordance with the invention here are Taylor reactors having an external reactor wall located within which there is a concentrically or eccentrically disposed rotor, a reactor floor, and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap broadens in the direction of flow traversal.

The monomers for combination are selected in accordance with the requirements of the intended use, so that the coating materials cured by actinic radiation, especially UV light, satisfy the requirements imposed. The basic principles when selecting and blending monomers for adjusting base properties in coating materials and the coatings produced using them, especially surface coatings, are known to the polymer chemist and coatings expert.

These requirements may differ considerably; for clear topcoats of metallic finishes in automobiles, for example, extremely high yellowing resistance and weathering stability, scratch resistance and gloss retention coupled with a high level of hardness are required. In the case of a coil coating material, i.e., a coating material which is used to coat metal sheets which are then wound up and later processed further with deformation, the important factors are very high elasticity and adhesion.

The price of the monomers as well may be a selection criterion if certain applications do not require high coating quality but do require a low price.

For example, the hardness, glass transition temperature, and softening point of the polyacrylates (A) may be increased by using higher fractions of "hard" monomers, such as styrene or the (meth)acrylates of C1 to C3 alcohols, whereas, for example, butyl acrylate, ethylhexyl acrylate or tridecyl acrylate, as "soft" monomers, lower these temperatures but at the same time improve the elasticity. Furthermore, it is also known that minor fractions of copolymerized (meth)acrylic acid or copolymerized (meth)acrylamide improve the adhesion.

The influences of the molecular weight and of the molecular weight distribution, and the control of the polymerization by means of regulators, temperature sensing, and catalyst selection are also prior art known to the skilled worker.

Examples of suitable monomers for synthesizing polyacrylates (A) are the esters of acrylic acid and methacrylic acid with aliphatic, cycloaliphatic, araliphatic and aromatic alcohols having from 1 to 40 carbon atoms such as methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, isoamyl (meth)acrylate, hexyl (meth)acrylate, 2-ethylhexyl (meth)acrylate, decyl (meth)acrylate, undecyl (meth)acrylate, dodecyl (meth)acrylate, tridecyl (meth)acrylate, cyclohexyl (meth)acrylate, methylcyclohexyl (meth)acrylate, benzyl (meth)acrylate, tetrahydrofurfuryl (meth)acrylate or furfuryl (meth)acrylate ; the esters of 3-phenylacrylic acid and the various isomeric forms thereof, e.g., methyl cinnamate, ethyl cinnamate, butyl cinnamate, benzyl cinnamate, cyclohexyl cinnamate, isoamyl cinnamate, tetrahydrofurfuryl cinnamate or furfuryl cinnamate; acrylamide, methacrylamide, methylolacrylamide or methylolmethacrylamide; acrylic acid, methacrylic acid or 3-phenylacrylic acid; hydroxyalkyl (meth)acrylates such as ethyl glycol mono(meth)acrylate, butyl glycol mono(meth)acrylate or hexanediol mono(meth)acrylate; glycol ether (meth)acrylates such as methoxyethyl glycol mono(meth)acrylate, ethyloxyethyl glycol mono(meth)acrylate, butyloxyethyl glycol mono(meth)acrylate or phenyloxyethyl glycol mono(meth)acrylate; glycidyl acrylate or glycidyl methacrylate; or amino (meth)acrylates such as 2-aminoethyl (meth)acrylate.

Further suitable comonomers include free-radically copolymerizable monomers such as styrene, 1-methylstyrene, 4-tert-butylstyrene or 2-chlorostyrene; vinyl esters of fatty acids having from 2 to 20 carbon atoms, such as vinyl acetate or vinyl propionate; vinyl ethers of alkanols having from 2 to 20 carbon atoms, such as vinyl isobutyl ether; vinyl chloride or vinylidene chloride; vinyl alkyl ketones; dienes such as butadiene or isoprene; and esters of maleic and crotonic acid. Further suitable comonomers include cyclic vinyl compounds such as vinylpyridine, 2-methyl-1-vinylimidazole, 1-vinylimidazole, 5-vinylpyrrolidone or N-vinylpyrrolidone. It is also possible to use comonomers containing allylic unsaturation, such as allyl alcohol, allyl alkyl esters, monoallyl phthalate or allyl phthalate, for example. Also suitable, furthermore, are acrolein and methacrolein and polymerizable isocyanates.

Of particular importance are the comonomers which contain particularly readily abstractable hydrogen atoms, in particular comonomers containing the following groups: isoalkyl groups having from 3 to 12 carbon atoms such as isopropyl, isobutyl or ethylhexyl groups; aminoisoalkyl groups having from 3 to 12 carbon atoms such as diisopropylaminoethyl or N-isobutyl-isopropylaminoalkyl groups; cycloisoalkyl groups having from 5 to 8 carbon atoms such as methylcyclohexyl, isopropylcyclohexyl, cycloalkyl, furfuryl, tetrahydrofurfuryl, p-menthyl, terpine and thymol groups. Also particularly suitable are isobornyl acrylate, isobornyl methacrylate, isorbornyl ethacrylate, isorbornyl cinnamate, adamantane acrylate, adamantane methacrylate, adamantane ethacrylate and also adamantane cinnamate in the various isomeric forms. Fractions of these comonomers increase the photosensitivity of the polymers.

Comonomers which carry further functional groups in addition to the double bond may be used for an additional thermally activatable crosslinking reaction and if so used are present in fractions of from 1 to 60% by weight of the comonomer mixtures. In general, however, they are used in minor amounts in which they improve, for example, the adhesion, the electrostatic chargeability, the rheology of the coating compositions of the invention, and the surface smoothness of the coatings of the invention. As incorporated stabilizers, furthermore, derivatives of 3-phenylacrylic acid improve the weathering stability of the coatings of the invention, especially the surface coatings.

Maleic anhydride is copolymerizable in fractions with (meth)acrylates and styrene; the corresponding copolymers undergo addition with water and dicyclopentadiene. These adducts are likewise suitable as polyacrylates (A).

Further polymers (A), especially polyethers, are in general terms obtained by polymer-analogous reaction of functional polymers with compounds which contain structural units I and/or II and/or photoinitiators and which are able to react with the functional groups of the polymers.

Compounds containing the structural units V and/or VI are obtained by way of the known addition reaction of dicyclopentadiene (DCPD) and water with anhydrides of dicarboxylic or tetracarboxylic acids, with particular preference maleic anhydride. In this case the acidity of the carboxyl groups, which following the addition of one mol of DCPD per anhydride of the ester group are adjacent, is lessened to such an extent that attempts to add on further DCPD result in the formation of oligostructure fractions (structural units II). Oligo-DCPD mixtures are also obtained by polycycloaddition of cyclopentadiene under pressure at temperatures of between 170° and 300° C. These mixtures may be worked up by distillation; preferably, however, they are reacted directly with, for example, maleic anhydride and water to give mixtures of compounds containing the structural units V and/or VI.

Esterification of these carboxylic acids with, for example, polyfunctional hydroxyl compounds, especially customary and known polyether polyols, leads to polymers (A), especially polyethers (A), containing the structural units I or V and/or II or VI, respectively.

The polyesters (B) for use in accordance with the invention are conventional, solid, saturated and/or unsaturated polyesters obtained by the known polycondensation of saturated and/or unsaturated dicarboxylic acids and/or their anhydrides with polyhydric alcohols. Polyesters (B) normally have a melting point of from 50 to 200° C., preferably from 70 to 120° C., and generally have a very low melt viscosity. They may also contain free hydroxyl groups and acid groups, with hydroxyl numbers of 5–150 and acid numbers of from 2 to 80 mg KOH/g.

In many cases it is also advantageous to start from the esters of the carboxylic acids and to produce the polyesters by transesterification at relatively high temperatures, since such transesterifications in certain cases take place more readily and more rapidly than the direct esterification.

Moreover, by using polyfunctional amines, it is also possible to obtain polyesters having amide structures. The use of monofunctional starting materials is possible as well, in order for example to regulate the molecular weight.

If polymer (A) contains structural units I or V and/or II or VI, these structural units needs need not be present in the polyesters (B).

Where the structural units are not used, however, it is mandatory in accordance with the invention for the polyesters (B) to contain maleic and/or fumaric esters incorporated in their main chains.

Of advantage in accordance with the invention, however, are polyesters (B) containing the structural units I and/or II.

Compounds which are preferred and readily available are the esterlike DCPD adducts with polycarboxylic acids, resulting, as a special case of the structural units I and II, in the structural units III and IV:

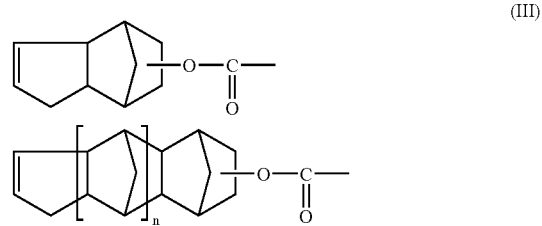

(III)

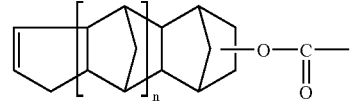

(IV) in which the index n is an integer from 1 to 10.

Adducts particularly easy to obtain are the above-described adducts of maleic anhydride and water with DCPD. The use of such adducts produces particularly preferred unsaturated polyesters (B).

Furthermore, dihydrodicyclopentadienol VII is available commercially and may be used when synthesizing the polyesters (B), thereby likewise introducing the structural units I and II.

(VII)

Examples of further suitable starting materials for the preparation of polyesters (B) are adipic acid, suberic acid, phthalic acid isomers, tetrahydrophthalic acid, endomethylenetetrahydrophthalic acid, hexahydrophthalic acid, fumaric acid, maleic acid, itaconic acid, citraconic acid, trimellitic acid or pyromellitic acid; ethylene glycol, polyethylene glycols, propylene glycol, polypropylene glycols, butanediol isomers, hexanediol, neopentyl glycol, trimethylolpropane, glycerol, pentaerythritol, bisphenol A or hydrogenated bisphenol A; OH-polyfunctional polymers such as hydroxyl-modified polybutadienes or hydroxyl-bearing polyurethane prepolymers and epoxy resins; polyfunctional natural substances or their derivatives such as linseed oil fatty acid, dimeric and polymeric linseed oil fatty acid, castor oil, and castor oil fatty acid. Also of importance are alkoxylated hydroxyfunctional compounds such as the ethoxylation and propoxylation products of the aforementioned polyols. Moreover, the introduction of amide and imide structures in accordance with DE-A-157 00 273 and DE-A-172 00 323 into polyesters (B) is also known prior art.

The introduction of the structural units I or V and/or II or VI takes place preferably through use of the above-described acidic esters in the course of the polycondensation.

A further possibility is to prepare polyesters with an excess of acid and then to react them with DCPD. In this case, a high degree of conversion generally necessitates the use of catalysts, an example being boron trifluoride etherate. At relatively high temperatures and pressure, the products include oligo-DCPD structures (structural unit II).

Where in this reaction the polyesters (B) contain double bonds in the polymer chain, e.g., in the form of maleic or fumaric esters, then grafting with cyclopentadiene produces endomethylenetetrahydrophthalic acid structures VIII.

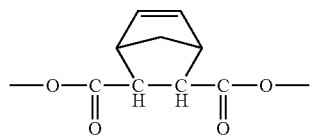

(VIII)

Also of particular importance are polyesters (B) in accordance with DE-A-43 21 533, which are obtained using hydroxy-functional allyl ethers and which have a particularly high photosensitivity. Also of significance are polyesters (B) whose carboxyl groups that remain free during the polycondensation are reacted with unsaturated epoxide compounds, preferably glycidyl (meth)acrylate; this measure also brings about an increase in photosensitivity.

The incorporation of photoinitiator groups II into the polyesters (B) is possible, for example, by using benzophenonetetracarboxylic acid, benzophenonetetracarboxylic anhydride or benzophenonetetracarboxylic esters or 4-hydroxybenzophenone in the polycondensation. In this context it is preferred first to prepare hydroxyl-terminated polyester precursors using an excess of hydroxyl compounds and then to react these precursors with benzophenonetetracarboxylic anhydride. The benzophenone structures are incorporated into the polyesters (B) in chain positions, and carboxyl groups are produced. It is likewise preferred then to react these carboxyl groups with unsaturated epoxide compounds, preferably glycidyl (meth)acrylate.

The synthesis of the polyesters (B) which satisfy specific requirements in respect, for example, of hardness, elasticity, viscosity or softening point is carried out in accordance with rules known to the skilled worker, through selection of the synthesis components and adjustment of the degree of condensation.

The coating materials of the invention, especially the powder coating materials of the invention, are obtained by mixing the polymers (A) and (B) in a proportion of from 99.5:0.5 to 0.5:99.5. Preference is given to proportions of from 90:10 to 50:50, and particular preference to proportions of from 80:20 to 60:40.

In order to increase the photosensitivity of the coating materials of the invention it is possible to use the customary photoinitiators, even if photoinitiator groups II are present in the binder mixtures of the invention. However, the use of the photoinitiator groups II is preferred.

The coating materials of the invention, especially the powder coating materials of the invention, may further comprise customary and known coatings ingredients, such as flow improvers, UV stabilizers, devolatilizing auxiliaries (e.g., benzoin) or colorants and fillers. The coating materials of the invention, especially the powder coating materials of the invention, are prepared by the known technologies, preferably in an extruder. In this context the very good thermal stability of the binder mixtures of the invention is a considerable advantage, since there is no risk of thermal damage within the extruder.

The coating materials of the invention, especially the powder coating materials of the invention, may be applied to a very wide variety of substrates using the known application techniques. A considerable acceleration in curing with actinic radiation, especially UV radiation, is possible with the combined application of heat and actinic radiation, especially UV light. Accordingly, it is possible to employ UV-curable powder coating materials of the invention on heat-sensitive substrates such as plastic and wood; in this case only the surface is heated, preferably with IR radiation, to the extent required to melt the powder, then UV light is irradiated. Curing through the combination of heat and UV radiation then takes place so rapidly that it is possible to rule out damage to the substrate.

At the curing stage a further possibility is to use one or more thermal curing mechanisms, known per se, as well, examples being cocrosslinking with polyfunctional isocyanates, aminoresins such as melamine, urea or benzoguanamine formaldehyde resins, or polyfunctional epoxides. The crosslinking mechanisms which can be employed additionally may also lead to the formation of interpenetrating networks in the coatings of the invention, as a result of which special, desirable properties, such as particularly high chemical resistance, are often achieved.

Overall, the binder mixtures of the invention and the coating materials of the invention, especially the powder coating materials of the invention, are outstandingly suitable for automotive OEM finishing, automotive refinish, industrial coating, including coil coating and container coating, the coating of plastics, and furniture coating, and give substrates of coatings of the invention to satisfy the continually growing requirements of the market.

EXAMPLES

Preparation Example 1

The Preparation of the Precursor 1 of the Structural Unit V (Monocarboxylic Acid V)

| 661.10 g of dicyclopentadiene | (5.0 mol) and |
|---|---|
| 490.30 g of maleic anhydride | (5.0 mol) | were weighed out into a stirring flask equipped with heater and reflux condenser. The mixture was heated to 125° C. under a gentle stream of nitrogen. Then

| 95.00 g of water | (5.0 mol + 5 g) |
|---|---| were added from a dropping funnel over the course of one hour. The mixture was allowed to react at 125° C. for one hour. The monocarboxylic acid V was formed.

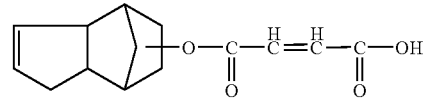

Preparation Example 2

The Preparation of a Polyester (B1) Containing Structural Units II and Fumaric Ester Groups in the Main Chain 240.00 g of dicyclohexanolpropane (1 mol),
236.00 g of 1,6-hexanediol (2 mol), 194.00 g of dimethyl terephthalate (1 mol), and 0.67 g of tin acetate were weighed out into a stirred flask equipped with heater and top-mounted distillation attachment. The mixture was heated rapidly to 120° C. under a gentle stream of nitrogen. Then the temperature was raised in stages to 190° C. over the course of 3 hours, during which the water of condensation formed was removed by distillation.

The contents of the flask were cooled to 90° C. and then the following were added:

516.80 g of precursor 1 (2 mol), 116.00 g of fumaric acid (1 mol), 4.00 g of dibutyltin dilaurate, and 0.50 g of hydroquinone.

The mixture was heated rapidly to 130° C. under a gentle stream of nitrogen, then the temperature was raised gradually to 190° C. over the course of 6 hours, during which the water of condensation formed was removed by distillation.

This gave the polyester (B1) having an acid number of 17, which solidified on cooling and gave non-caking powders on grinding.

Preparation Example 3

The Preparation of a Polyester (B2) without Structural Units I and/or II but with Fumaric Ester Groups in the Main Chain 240.00 g of dicyclohexanolpropane (1 mol), 236.00 g of 1,6-hexanediol (2 mol), 194.00 g of dimethyl terephthalate (1 mol), and 0.67 g of tin acetate were weighed out into a stirred flask equipped with heater and top-mounted distillation attachment. The mixture was heated rapidly to 120° C. under a gentle stream of nitrogen. Then the temperature was raised in stages to 190° C. over the course of 3 hours, during which the water of condensation formed was removed by distillation.

The contents of the flask were cooled to 90° C. and then the following were added:

146.00 g of adipic acid (2 mol), 116.00 g of fumaric acid (1 mol), 4.00 g of dibutyltin dilaurate, and 0.50 g of hydroquinone.

The mixture was heated rapidly to 130° C. under a gentle stream of nitrogen, then the temperature was raised gradually to 190° C. over the course of 6 hours, during which the water of condensation formed was removed by distillation.

This gave the polyester (B2) having an acid number of 26, which solidified on cooling and gave non-caking powders on grinding.

Preparation Example 4

The Preparation of Polyacrylate (A1) Containing Structural Units I and Photoinitiator Groups II 243 g of isopropanol and 243 g of toluene were weighed out into a stirred flask equipped with heater, reflux condenser and nitrogen feed and were heated to reflux (about 85° C.); then 300 g of dihydrodicyclopentadienyl acrylate, 370 g of methyl methacrylate, 120 g of glycidyl methacrylate, 219 g of butyl acrylate, and 10 g of mercaptoethanol were added from a dropping funnel over the course of two hours, and 30 g of Wako® V 59 (from Wako, azo initiator) and 180 g of toluene were added from a second dropping funnel over the course of two and a half hours. The batch was polymerized at reflux for 2 hours. The resulting reaction mixture was cooled to about 50° C. Then 166 g of 4-hydroxybenzophenone and 1 g of dimethylaminopyridine were added.

The condenser was then swapped for a top-mounted distillation attachment. The temperature was raised to 160° C. over the course of 8 hours, during which the solvent was removed by distillation. Then reduced pressure was applied and the reaction mixture was held at 160° C. for a further 2 hours. This gave a melt of the polyacrylate (A1), which solidified when poured out onto aluminum foil and after grinding gave blocking-resistant powders at 25° C. The resin had a melting point of 62° C. and a glass transition temperature of 52° C., measured by means of the DSC method.

Preparation Example 5

The Preparation of Polyacrylate (A2) Containing Structural Units I 243 g of isopropanol and 243 g of toluene were weighed out into a stirred flask equipped with heater, reflux condenser and nitrogen feed and were heated to reflux (about 85° C.); then 300 g of dihydrodicyclopentadienyl acrylate, 460 g of methyl methacrylate, 249 g of butyl acrylate, and 10 g of mercaptoethanol were added from a dropping funnel over the course of two hours, and 30 g of Wako® V 59 (from Wako, azo initiator) and 180 g of toluene were added from a second dropping funnel over the course of two and a half hours. The resulting reaction mixture was subsequently polymerized at reflux for 2 hours.

The condenser was then swapped for a top-mounted distillation attachment. The temperature was raised to 160° C., during which the solvent was removed by distillation. Then reduced pressure was applied and the reaction mixture was held at 160° C. for a further 2 hours. This gave a melt of the polyacrylate (A2), which solidified when poured out onto aluminum foil and after grinding gave blocking-resistant powders at 25° C. The resin had a melting point of 66° C. and a glass transition temperature of 58° C., measured by means of the DSC method.

Examples 1 to 7

The Preparation of Inventive Powder Coating Materials

In a heatable laboratory kneading device, binder mixtures were produced by kneading under nitrogen at 100° C. and were then discharged onto aluminum foil and left to cool.

Thereafter the binder mixtures were ground in a laboratory hammer mill and screened to a particle size of <60 μm. The powder coating materials obtained were scattered onto clean steel panels, using a sieve, in an amount so as to give film thicknesses of about 80 μm after curing. The steel panels were then placed on a temperature-regulated hotplate at a temperature of 130° C. and heated for 5 minutes; during that time the powder coating melted to give a layer which flowed out well, and which then remained on the hotplate and was irradiated for 2 minutes using a quartz UV lamp having an emission maximum of about 365 nm and an energy output (measured in the plane of the coating films) of 17 mW/cm². Thereafter, the specimens were taken from the hotplate, cooled, and one hour later rubbed 30 times with a cotton pad soaked in acetone. The table gives an overview of the composition of the powder coating materials of the invention and their solvent resistance.

TABLE

The composition and solvent resistance of the inventive powder coating materials (Examples 1 to 7)

| Example No. | Polyacrylate (A) | Polyester (B) | Photoinitiator | Acetone resistance |
|---|---|---|---|---|
| 1 | A1/140 g | B1/60 g | — | 0 |
| 2 | A1/140 g | B2/60 g | — | 2 |
| 3 | A1/140 g | B2/60 g | 6 g BDMK | 0 |
| 4 | A2/140 g | B1/60 g | — | 4 |
| 5 | A2/140 g | B1/60 g | 6 g BDMK | 2–3 |
| 6 | A2/140 g | B2/60 g | — | 4 |
| 7 | A2/140 g | B2/60 g | 6 g BDMK | 3 |

BDMK = benzil dimethyl ketal
Ratings for acetone resistance: 0 = no attack to 5 = soluble, uncrosslinked It was found that the use of both structural units I and photoinitiator groups II gave the best results.

What is claimed is:

1. A binder mixture comprising (A) at least one polymer with a saturated main chain that is not polyester and (B) at least one polyester having a main chain that is saturated or unsaturated, wherein, (i) at least one of (A) and/or (B) has at least one of structural units I and/or II,

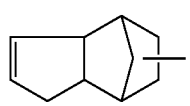

(I)

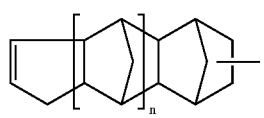

(II)

in which the index n is an integer from 1 to 10;
and with the provisos that (ii) when the polyester (B) has no structural units I or II, (B) comprises at least one of maleic esters and/or fumaric esters incorporated in its main chain, and (iii) when (A) contains no structural units I or II, (A) comprises covalently bonded photoinitiators of the Norrish II type as at least one of side groups and/or end groups, and wherein at least one of:

(I) polymer (A) is a polyacrylate and comprises at least one copolymeric poly(meth)acrylate comprising in copolymerized form at least one (meth)acrylate monomer comprising at least one of structural unit I, structural unit II, further (meth)acrylic esters, and/or further olefinically unsaturated monomers copolymerizable therewith, and/or (II) components (A) and (B) are in a weight proportion of from 50:50 to 99.5:0.5.

2. The binder mixture as claimed in claim 1, wherein the polymer (A) comprises at least one of structural unit I and/or II and also at least one covalently bonded photoinitiator of the Norrish II type as at least one of a side group and/or end group.

3. The binder mixture of claim 1, wherein the polyester (B) comprises at least one of structural units I and/or II and at least one of maleic esters and/or fumaric ester groups incorporated in its main chain.

4. The binder mixture of claim 1, wherein the polymer (A) further comprises at least one of another polyacrylate, a polyurethane, a polyether, and/or a polyepoxide.

5. The binder mixture as claimed in claim 4, wherein the polyurethanes (A) comprises the reaction products of a polyisocyanates, a compounds comprising isocyanate-reactive groups, and at least one of the following:

i) a compounds comprising at least one structural unit I and at least one isocyanate-reactive group, ii) a compounds comprising at least one structural unit II and at least one isocyanate-reactive group iii) a compounds comprising at least one structural unit I, at least one structural unit II, and at least one isocyanate-reactive group, and/or iv) a compounds comprising at least one photoinitiator group and at least one isocyanate-reactive group.

6. The binder mixture as claimed in claim 4, wherein the polyepoxides (A) comprises a reaction products of a polyepoxides and at least one of i) a compounds comprising at least one structural unit I and at least one epoxide-reactive group;

ii) a compounds comprising at least one structural unit II and at least one epoxide-reactive group;

iii) a compounds comprising at least one structural unit I, at least one structural unit II, and at least one epoxide-reactive group; and/or iv) a compounds comprising at least one photoinitiator group and at least one epoxide-reactive group.

7. The binder mixture of claim 1, wherein in the polyesters (B) the structural unit I is incorporated in the form of the structural unit III

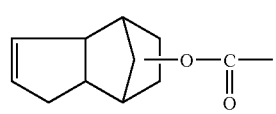

(III)

and the structural unit II is incorporated in the form of the structural unit IV

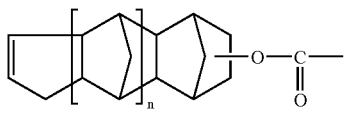 (IV)

in which the index n is an integer from 1 to 10.

8. The binder mixture of claim 1, wherein in at least one of (A) and/or (B) the structural unit I is incorporated in the form of the structural unit V

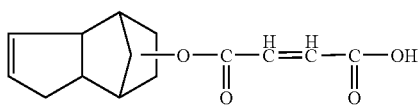 (V)

and the structural unit II is incorporated in the form of structural units VI

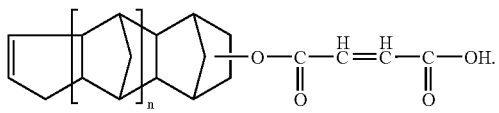 (VI)

9. The binder mixture of claim 1 comprising components (A) and (B) in a weight proportion of from 60:40 to 99.5:0.5.

10. A method of using the binder mixture of claim 1 comprising preparing coating materials comprising the binder mixture of claim 1, wherein the coating materials are curable by at least one of thermally and/or with actinic radiation.

11. The method of claim 10, wherein the binder mixture is characterized by at least one of:

i) the polymer (A) comprises at least one structural unit I and/or II and also at least one covalently bonded photoinitiator of the Norrish II type as at least one of a side group and/or end group;
ii) the polyester (B) comprises at least one of structural units I and/or II and at least one of maleic esters and/or fumaric ester groups incorporated in its main chain;
iii) the polymer (A) further comprises at least one of another polyacrylate, a polyurethane, a polyether, and/or a polyepoxide;
iv) in the polyesters (B), the structural unit I is incorporated in the form of the structural unit III

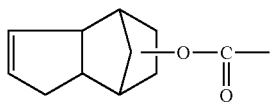 (III)

and the structural unit II is incorporated in the form of the structural unit IV

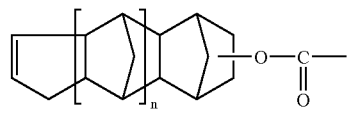 (IV)

in which the index n is an integer from 1 to 10;
v) in at least one of (A) and/or (B) the structural unit I is incorporated in the form of the structural unit V

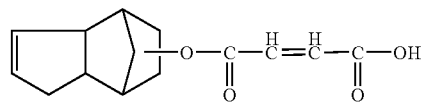 (V)

and the structural unit II is incorporated in the form of structural units VI

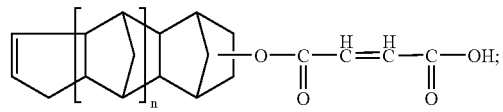 (VI)

and/or
vi) components (A) and (B) are in a weight proportion of from 60:40 to 99.5:0.5.

12. A coating material comprising the binder mixture of claim 1, wherein the coating material is curable by at least one of thermally and/or with actinic radiation.

13. The coating material of claim 12, wherein the binder mixture is characterized by at least one of:

i) the polymer (A) comprises at least one structural unit I and/or II and also at least one covalently bonded photoinitiator of the Norrish II type as at least one of a side group and/or end group;
ii) the polyester (B) comprises at least one of structural units I and/or II and at least one of maleic esters and/or fumaric ester groups incorporated in its main chain;
iii) the polymer (A) further comprises at least one of another polyacrylate, a polyurethane, a polyether, and/or a polyepoxide;
iv) in the polyesters (B), the structural unit I is incorporated in the form of the structural unit III

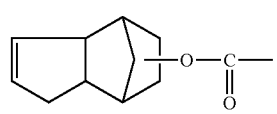 (III)

and the structural unit II is incorporated in the form of the structural unit IV

 (IV)

in which the index n is an integer from 1 to 10;
v) in at least one of (A) and/or (B) the structural unit I is incorporated in the form of the structural unit V (V)

![Structure V: dicyclopentadiene-O-C(=O)-CH=CH-C(=O)-OH]

and the structural unit II is incorporated in the form of structural units VI (VI)

![Structure VI: [dicyclopentadiene]n-O-C(=O)-CH=CH-C(=O)-OH]

and/or vi) components (A) and (B) are in a weight proportion of from 60:40 to 99.5:0.5.

14. A method of using the coating material as claimed in claim 12 comprising applying the coating material to a substrate and curing the coating material by at least one of actinic radiation and/or heating.

15. The method of claim 14, wherein the binder mixture is characterized by at least one of:
   i) the polymer (A) comprises at least one structural unit I and/or II and also at least one covalently bonded photoinitiator of the Norrish II type as at least one of a side group and/or end group;
   ii) the polyester (B) comprises at least one of structural units I and/or II and at least one of maleic esters and/or fumaric ester groups incorporated in its main chain;
   iii) the polymer (A) further comprises at least one of another polyacrylate, a polyurethane, a polyether, and/or a polyepoxide;
   iv) in the polyesters (B), the structural unit I is incorporated in the form of the structural unit III (III)

![Structure III: dicyclopentadiene-O-C(=O)-]

and the structural unit II is incorporated in the form of the structural unit IV (IV)

![Structure IV: [dicyclopentadiene]n-O-C(=O)-]

in which the index n is an integer from 1 to 10;
   v) in at least one of (A) and/or (B) the structural unit I is incorporated in the form of the structural unit V (V)

![Structure V: dicyclopentadiene-O-C(=O)-CH=CH-C(=O)-OH]

and the structural unit II is incorporated in the form of structural units VI (VI)

![Structure VI: [dicyclopentadiene]n-O-C(=O)-CH=CH-C(=O)-OH]

and/or vi) components (A) and (B) are in a weight proportion of from 60:40 to 99.5:0.5.

16. A method of coating substrates for one of an automotive OEM finish, an automotive refinish, an industrial coating, a coil coating, a container coating, or a furniture coating comprising applying the coating material of claim 12 to the substrate and curing it by at least one of with actinic radiation and/or by heating.

17. The method of claim 16, wherein the binder mixture is characterized by at least one of:
   i) the polymer (A) comprises at least one structural unit I and/or II and also at least one covalently bonded photoinitiator of the Norrish II type as at least one of a side group and/or end group;
   ii) the polyester (B) comprises at least one of structural units I and/or II and at least one of maleic esters and/or fumaric ester groups incorporated in its main chain;
   iii) the polymer (A) further comprises at least one of another polyacrylate, a polyurethane, a polyether, and/or a polyepoxide;
   iv) in the polyesters (B), the structural unit I is incorporated in the form of the structural unit III (III)

![Structure III: dicyclopentadiene-O-C(=O)-]

and the structural unit II is incorporated in the form of the structural unit IV (IV)

![Structure IV: [dicyclopentadiene]n-O-C(=O)-]

in which the index n is an integer from 1 to 10;
   v) in at least one of (A) and/or (B) the structural unit I is incorporated in the form of the structural unit V (V)

![Structure V: dicyclopentadiene-O-C(=O)-CH=CH-C(=O)-OH]

and the structural unit II is incorporated in the form of structural units VI

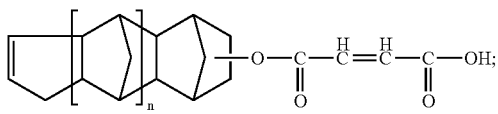

and/or vi) components (A) and (B) are in a weight proportion of from 60:40 to 99.5:0.5.

18. A substrate coated by the method of claim 16.

19. The substrate of claim 18, wherein the binder mixture is characterized by at least one of:

i) the polymer (A) comprises at least one structural unit I and/or II and also at least one covalently bonded photoinitiator of the Norrish II type as at least one of a side group and/or end group;

ii) the polyester (B) comprises at least one of structural units I and/or II and at least one of maleic esters and/or fumaric ester groups incorporated in its main chain;

iii) the polymer (A) further comprises at least one of another polyacrylate, a polyurethane, a polyether, and/or a polyepoxide;

iv) in the polyesters (B), the structural unit I is incorporated in the form of the structural unit III

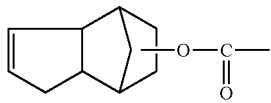

and the structural unit II is incorporated in the form of the structural unit IV

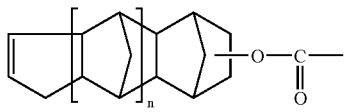

in which the index n is an integer from 1 to 10;

v) in at least one of (A) and/or (B) the structural unit I is incorporated in the form of the structural unit V

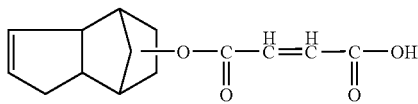

and the structural unit II is incorporated in the form of structural units VI

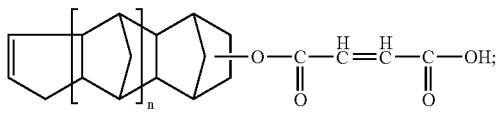

and/or vi) components (A) and (B) are in a weight proportion of from 60:40 to 99.5:0.5.

20. The binder mixture of claim 1 further characterized by at least two of the following:

i) the polymer (A) comprises at least one structural unit I and/or II and also at least one covalently bonded photoinitiator of the Norrish II type as at least one of a side group and/or end group;

ii) the polyester (B) comprises at least one of structural units I and/or II and at least one of maleic esters and/or fumaric ester groups incorporated in its main chain;

iii) the polymer (A) further comprises at least one of another polyacrylate, a polyurethane, a polyether, and/or a polyepoxide;

iv) in the polyesters (B), the structural unit I is incorporated in the form of the structural unit III

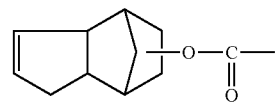

and the structural unit II is incorporated in the form of the structural unit IV

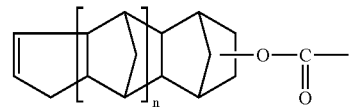

in which the index n is an integer from 1 to 10;

v) in at least one of (A) and/or (B) the structural unit I is incorporated in the form of the structural unit V

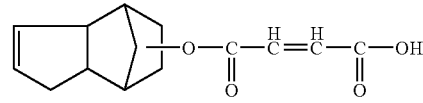

and the structural unit II is incorporated in the form of structural units VI

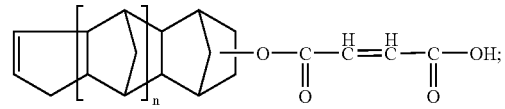

and/or vi) components (A) and (B) are in a weight proportion of from 60:40 to 99.5:0.5.

21. The binder mixture of claim 20, wherein polymer (A) further comprises the polyurethane comprising a reaction products of a polyisocyanates, a compounds comprising isocyanate-reactive groups, and at least one of the following:

i) a compounds comprising at least one structural unit I and at least one isocyanate-reactive group, ii) a compounds comprising at least one structural unit II and at least one isocyanate-reactive group iii) a compounds comprising at least one structural unit I, at least one structural unit II, and at least one isocyanate-reactive group, and/or iv) a compounds comprising at least one photoinitiator group and at least one isocyanate-reactive group.

22. The binder mixture of claim 20, wherein polymer (A) further comprises the polyepoxide comprising a reaction products of a polyepoxides and at least one of
- i) a compounds comprising at least one structural unit I and at least one epoxide-reactive group;
- ii) a compounds comprising at least one structural unit II and at least one epoxide-reactive group;
- iii) a compounds comprising at least one structural unit I, at least one structural unit II, and at least one epoxide-reactive group; and/or
- iv) a compounds comprising at least one photoinitiator group and at least one epoxide-reactive group.

* * * * *